(12) United States Patent
Yagi et al.

(10) Patent No.: US 7,045,567 B2
(45) Date of Patent: May 16, 2006

(54) RUBBER COMPOSITION FOR TIRE TREAD AND PNEUMATIC TIRE USING THE RUBBER COMPOSITION

(75) Inventors: Noriko Yagi, Kobe (JP); Kiyoshige Muraoka, Kobe (JP); Toshiaki Sakaki, Kobe (JP); Kazuyuki Nishioka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/863,345

(22) Filed: Jun. 9, 2004

(65) Prior Publication Data

US 2005/0027060 A1   Feb. 3, 2005

(30) Foreign Application Priority Data

Jul. 30, 2003   (JP) .............................. 2003-203992

(51) Int. Cl.
*C08K 3/34* (2006.01)
(52) U.S. Cl. ...................... 524/493; 524/495; 528/932; 528/930
(58) Field of Classification Search ................ 524/493, 524/495; 528/932, 930
See application file for complete search history.

(56) References Cited

U.S. PATENT DOCUMENTS 3,689,300 A * 9/1972 Bunger et al. ........... 106/287.1
5,872,173 A * 2/1999 Anand ........................ 524/494
6,204,358 B1 * 3/2001 Tanaka et al. ...................... 1/1

FOREIGN PATENT DOCUMENTS

| EP | 0 805 163 A3 | 11/1997 |
|---|---|---|
| EP | 1 426 409 A1 | 6/2004 |
| JP | 6-056902 A | 3/1994 |
| JP | 6-329838 A | 11/1994 |
| JP | 8-143606 A | 6/1996 |
| JP | 11-71408 A | 3/1999 |
| JP | 2000-198801 A | 7/2000 |
| WO | WO 03/082925 A1 | 10/2003 |

* cited by examiner

*Primary Examiner*—Ling-Sui Choi
(74) *Attorney, Agent, or Firm*—Birch,Stewart,Kolasch & Birch,LLP

(57) ABSTRACT

The present invention provides a rubber composition that improves processability and fuel efficiency without decreasing mechanical strength and abrasion resistance, which are excellent properties of natural rubber, and a pneumatic tire using the rubber composition for a tire tread. Specifically, the present invention provides a rubber composition for a tire tread comprising 5 to 150 parts by weight of silica having nitrogen-adsorbing specific surface area of 100 to 300 $m^2/g$ and/or 5 to 150 parts by weight of carbon black having nitrogen-adsorbing specific surface area of at least 70 $m^2/g$ and dibutyl phthalate oil absorption of at least 70 ml/100 g, based on 100 parts of a rubber component containing 5 to 100% by weight of a deproteinized natural rubber having a weight average molecular weight of 1,400,000 and nitrogen content of at most 0.1% by weight, and a pneumatic tire comprising the rubber composition for a tire tread.

11 Claims, No Drawings

RUBBER COMPOSITION FOR TIRE TREAD AND PNEUMATIC TIRE USING THE RUBBER COMPOSITION

This Non-provisional application claims priority under 35 U.S.C. § 119(a) on Patent Application No(s). 2003-203992 filed in Japan on Jul. 30, 2003, the entire contents of which are hereby incorporated by reference.

BACKGROUND OF THE INVENTION

The present invention relates to a rubber composition using deproteinized natural rubber and a pneumatic tire using the rubber composition for a tire tread.

Natural rubber has excellent raw rubber strength (green strength) compared to synthetic rubber and is excellent in processability. Also, natural rubber has high mechanical strength and excellent abrasion resistance as vulcanized rubber and therefore is frequently used in large tires such as truck/bus tires. However, in recent years, from the viewpoint of environmental problems such as tightening regulations for resource conservation and prevention of carbon dioxide exhaust, fuel efficiency of large tires is considered important and improving fuel efficiency without losing abrasion resistance, which is an excellent property of natural rubber, is an urgent task.

Also, in natural rubber, it is known that non-rubber components such as protein and lipid that are present in natural rubber cause molecules to intertwine with one another, thereby causing gelation. When gelation occurs, there is the problem that viscosity of the rubber increases and processability becomes poor. Usually, in order to improve processability of natural rubber, the method of lowering the molecular weight by masticating with a mixing mill or an internal mixer is used. However, mastication randomly cuts molecular chains and as a result, causes fuel efficiency to become poor. On the other hand, the method of removing protein, which is one of the factors that cause gelation, has been suggested as a method for inhibiting gelation. For example, the method of removing non-rubber components such as protein by centrifuging latex is known (see JP-A-6-56902, JP-A-8-143606, JP-A-11-71408, JP-A-2000-198801, JP-A-6-329838). However, the natural rubber obtained by these methods has the problem that as a result of removing non-rubber components and gel content, molecular weight decreases and raw rubber strength decreases.

SUMMARY OF THE INVENTION

The present invention aims to provide a rubber composition, which improves processability and fuel efficiency without decreasing mechanical strength and abrasion resistance, which are excellent properties of natural rubber, and a pneumatic tire using the rubber composition for a tire tread.

The present invention relates to a rubber composition for a tire tread comprising 5 to 150 parts by weight of silica having nitrogen-adsorbing specific surface area of 100 to 300 m$^2$/g and/or 5 to 150 parts by weight of carbon black having nitrogen-adsorbing specific surface area of at least 70 m$^2$/g and dibutyl phthalate oil absorption of at least 70 ml/100 g, based on 100 parts by weight of a rubber component containing 5 to 100% by weight of a deproteinized natural rubber having weight average molecular weight of 1,400,000 and nitrogen content of at most 0.1% by weight.

The gel content of the deproteinized natural rubber measured as matter that is insoluble in toluene is preferably at most 10% by weight.

A silane coupling agent is preferably contained in an amount of 0 to 20 parts by weight based on 100 parts by weight of silica.

The present invention also relates to a pneumatic tire comprising the rubber composition for a tire tread

DETAILED DESCRIPTION

The present invention is described in detail below.

The rubber composition for a tire tread of the present invention comprises deproteinized natural rubber and silica and/or carbon black.

In normal natural rubber, non-rubber components such as protein and lipid are present in an amount of 5 to 10% by weight. These non-rubber components, particularly protein, are said to cause intertwining of molecules and to be factors in causing gelation. Therefore, in the present invention, deprotenized natural rubber obtained by removing non-rubber components from natural rubber is compounded in the rubber composition.

The weight average molecular weight of the deproteinized natural rubber is at least 1,400,000. When the weight average molecular weight is less than 1,400,000, raw rubber strength decreases.

The nitrogen content of deproteinized natural rubber is at most 0.1% by weight, preferably at most 0.08% by weight, more preferably at most 0.05% by weight. When the nitrogen content is more than 0.1% by weight, gelation may occur.

The amount of the deproteinized natural rubber is 5 to 100% by weight, preferably 10 to 80% by weight. When the amount is less than 5% by weight, the effect of compounding deproteinized natural rubber is small, thus being unfavorable.

Examples of the method for deproteinizing natural rubber are (1) the method of decomposing protein by adding a protein-decomposing enzyme or bacteria to latex of natural rubber, (2) the method of decomposing protein by adding alkali to latex of natural rubber and then heating and (3) the method of isolating protein that is adsorbed by rubber using a surfactant such as soap. The latex of natural rubber that is subjected to deproteinizing treatment is not particularly limited and can be either one of field latex or ammonia-treated latex.

The protein-decomposing enzyme can be a conventionally known enzyme and is not particularly limited. For example, protease is suitably used. The protease can be derived from any of bacteria, filamentous bacteria or yeast and of these protease derived from bacteria is preferable. Also, enzymes such as lipase, esterase, amylase, laccase and cellulase can be used together.

When alkali protease is used as the protein-decomposing enzyme, the activity thereof is suitably within the range of 0.1 to 50 APU/g, preferably 1 to 25 APU/g.

The enzyme activity can be measured using a modified version of the Anson-hemoglobin method [Anson. M. L., J. Gen. Physiol., 22, 79 (1938)]. That is, reaction is conducted at a temperature of 25° C. and pH of 10.5 for 10 minutes in a solution adjusted so that the final concentration of urea-modified hemoglobin, which is used as the matrix, becomes 14.7 mg/ml. After the reaction, trichloroacetic acid is added to the reaction solution so that the final concentration becomes 31.25 mg/ml. Then, the matter dissolved in trichloroacetic acid is colored by a phenol reagent and the activity per 10 minutes of reaction was found from a working curve, wherein the coloring degree of 1 mol of tyrosine is assumed to be 1 APU. The results are converted to activity per minute to measure the enzyme activity. 1 APU refers to the amount of protease that provides soluble matter of trichlororacetic acid having the same coloring degree as when 1 mol of tyrosine is colored by a phenol reagent in 1 minute. The method for measuring activity of alkali protease is not limited to this method.

The amount of the protein-decomposing enzyme is determined according to the enzyme activity, but is usually 0.0001 to 20 parts by weight, preferably 0.001 to 10 parts by weight, based on 100 parts by weight of the solid content of the latex of natural rubber. When the amount of the enzyme is less than 0.0001 part by weight, the protein in the latex may not be sufficiently decomposed. When the amount is more than 20 parts by weight, activity of the enzyme decreases and cost becomes high, thus being unfavorable.

The time for treatment by the enzyme is not particularly limited and can be determined according to the enzyme activity. Usually, treatment is preferably conducted for a few minutes to approximately one week. During deproteinization treatment, the latex can be stirred or can be left still. Also, when necessary, the temperature can be adjusted and a suitable temperature is 5 to 90° C., preferably 20 to 60° C. When the treatment temperature is higher than 90° C., the enzyme is quickly deactivated and when the temperature is lower than 5° C., the enzyme reaction has difficulty progressing.

As the surfactant used in the method of conducting deproteinization using a surfactant, an anionic surfactant and/or a nonionic surfactant and/or an ampholytic surfactant can be used. Examples of the anionic surfactant are carboxylic acid types, sulfonic acid types, sulfuric ester types and phosphoric ester types. As the nonionic surfactant, polyoxyalkylene ether types, polyoxyalkylene ester types, polyol fatty acid ester types, sugar fatty acid ester types and alkyl polyglycoxide types can be suitably used. Examples of the ampholytic surfactant are amino acid types, betaine types and amine oxide types.

The method for washing latex particles with a surfactant can be either the method of washing the latex before enzyme treatment or the method of washing the latex after enzyme treatment. As a specific washing method, there are the method of adding the surfactant to the latex before or after enzyme treatment and then centrifuging and the method of separating by coagulating the latex particles. In the case of washing the latex by centrifuging, centrifugation can be conducted once or several times. Usually, latex of deproteinized natural rubber, from which protein is removed in a high degree, can be obtained by centrifuging one time. Also, the latex can be diluted with water so that the concentration of the rubber component of the natural rubber latex becomes 5 to 40% by weight, preferably 10 to 30% by weight, and then centrifuged.

The amount of the surfactant is 0.001 to 20 parts by weight, preferably 0.001 to 15 parts by weight, based on 100 parts by weight of the solid content of the latex.

In the present invention, the method for obtaining deproteinized natural rubber is not particularly limited. Also, when using the enzymes and surfactants described above, other additives such as a pH adjusting agent and a dispersant can be added.

Examples of the pH adjusting agent are phosphates such as potassium dihydrogen phosphate, potassium hydrogen phosphate, sodium dihydrogen phosphate and sodium hydrogen phosphate; acetates such as potassium acetate and sodium acetate; acids such as sulfuric acid, acetic acid, hydrochloric acid, nitric acid, citric acid and succinic acid and salts thereof; ammonium; potassium hydroxide; sodium hydroxide; sodium carbonate and sodium hydrogen carbonate. The amount of the pH adjusting agent is usually 0.01 to 0.5 part by weight based on 100 parts by weight of the solid rubber content of the latex.

Examples of the dispersant are copolymers of styrenesulfonic acid, condensates of formalin and naphthalenesulfonate, lignin sulfonic acid, copolymers of polycyclic aromatic sulfonic acid, homopolymers and copolymers of acrylic acid and maleic anhydride and copolymers of isobutylene-acrylic acid and isobutylene-maleic anhydride.

In the present invention, the latex of deproteinized natural rubber obtained by the above method can be coagulated after removing non-rubber components by centrifugation or can be coagulated without removing non-rubber components. The method for coagulating is not particularly limited and can be a known method. Usually, the coagulation method of making the latex rubber particles unstable by adding a coagulating agent, such as acid including formic acid and sulfuric acid or a salt such as sodium chloride, and the coagulation method of making the latex rubber particles unstable utilizing the clouding point of the surfactant can be used.

The gel content of the deprotenized natural rubber measured as matter that is insoluble toluene is preferably at most 10% by weight. When the gel content is more than 10% by weight, viscosity of the unvulcanized rubber increases and processability tends to decrease.

As rubber components that are used in the present invention other than deproteinized natural rubber, rubber components comprising natural rubber and/or diene synthetic rubber are used. Examples of the diene synthetic rubber used in the present invention are styrene-butadiene rubber (SBR), polybutadiene rubber (BR), polyisoprene rubber (IR), ethylene-propylene-diene rubber (EPDM), chloroprene rubber (CR), acrylonitrile-butadiene rubber (NBR) and butyl rubber (IIR). These rubbers may be used alone or two or more kinds may be used together.

The rubber composition of the present invention preferably contains silica. The silica can be silica prepared by a wet method or a dry method and is not particularly limited.

The silica used in the present invention has nitrogen-adsorbing specific surface area ($N_2SA$) of 100 to 300 $m^2/g$, preferably 120 to 280 $m^2/g$. When $N_2SA$ of the silica is less than 100 $m^2/g$, the reinforcing effects are small and when $N_2SA$ is more than 300 $m^2/g$, dispersability decreases and heat generating properties of the rubber composition increase, thus being unfavorable.

The amount of silica is 5 to 150 parts by weight, preferably 10 to 120 parts by weight, more preferably 15 to 100 parts by weight, based on 100 parts by weight of the rubber component. When the amount of silica is less than 5 parts by weight, low heat generating properties and wet grip performance cannot sufficiently be obtained and when the amount is more than 150 parts by weight, processability and workability become poor, thus being unfavorable.

The rubber composition of the present invention preferably contains carbon black.

The carbon black used in the present invention has nitrogen-adsorbing specific surface area ($N_2SA$) of at least 70 $m^2/g$, more preferably 80 to 180 $m^2/g$. When $N_2SA$ of carbon black is less than 70 $m^2/g$, reinforcing properties are small, thus being unfavorable.

The carbon black has (DBP) dibutyl phthalate oil absorption of at least 70 ml/100 g, preferably 80 to 160 ml/100 g.

When DBP absorption is less than 70 ml/100 g, reinforcing properties are small, thus being unfavorable.

Specific examples of the carbon black are HAF, ISAF and SAF, but are not particularly limited.

The amount of carbon black is 5 to 150 parts by weight, preferably 10 to 120 parts by weight, more preferably 15 to 100 part by weight, based on 100 parts by weight of the rubber component. When the amount of carbon black is less than 5 parts by weight, low heat generating properties and wet grip performance cannot sufficiently be obtained and when the amount is more than 150 parts by weight, processability and workability become poor, thus being unfavorable.

The rubber composition of the present invention preferably contains a silane coupling agent. The silane coupling agent that can suitably be used in the present invention is any silane coupling agent that is conventionally used together with a silica filler. Specific examples are sulfide-types such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N, N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazolyltetrasulfide, 3-triethoxysilylpropylmethacrylatemonosulfide and 3-trimethoxysilylpropylmethacrylatemonosulfide; mercapto-types such as 3-mercaptopropyltrimethoxysilane, 3-mercaptopropyltriethoxysilane, 2-mercaptoethyltrimethoxysilane and 2-mercaptoethyltriethoxysilane; vinyl-types such as vinyl triethoxysilane and vinyl trimethoxysilane; amino-types such as 3-aminopropyltriethoxysilane, 3-aminopropyltrimethoxysilane, 3-(2-aminoethyl)aminopropyltriethoxysilane and 3-(2-aminoethyl)aminopropyltrimethoxysilane; glycidoxy-types such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro-types such as 3-nitropropyltrimethoxysilane and 3-nitropropyltriethoxysilane; and chloro-types such as 3-chloropropyltrimethoxysilane, 3-chloropropyltriethoxysilane, 2-chloroethyltrimethoxysilane and 2-chloroethyltriethoxysilane. In view of achieving both the effects of adding the coupling agent and low cost, bis(3-triethoxysilylpropyl) tetrasulfide, bis(3-triethoxysilylpropyl)disulfide and 3-mercaptopropyltrimethoxysilane are suitably used. These coupling agents may be used alone or two or more kinds may be used together.

The amount of the silane coupling agent is preferably 0 to 20 parts by weight based on 100 parts by weight of silica. When the amount of the silane coupling agent is more than 20 parts by weight, the coupling effect cannot be obtained although cost is high and reinforcing properties and abrasion resistance decrease, thus being unfavorable. In view of the dispersion effect and the coupling effect, the amount of the silane coupling agent is more preferably 2 to 15 parts by weight.

Besides the rubber component, deproteinized natural rubber, carbon black, silica and silane coupling agent, other compounding agents that are usually used in the rubber industry can be compounded to the rubber composition of the present invention when necessary, such as a softening agent, an antioxidant, a vulcanizing agent, a vulcanization accelerator and a vulcanization accelerating aid.

The tire of the present invention is prepared by the usual method using the rubber composition of the present invention. That is, the rubber composition of the present invention to which the above additives are added when necessary is extrusion molded into the shape of each member of a tire before vulcanization and then formed into a tire by the usual method on a tire molding machine to prepare an unvulcanized tire. The unvulcanized tire is heated and pressurized in a vulcanizer to prepare a tire. Particularly, the tire of the present invention is suitably used for a studless tire.

Hereinafter, the present invention is explained in detail by means of Examples, but the present invention is not limited thereto.

The compounding agents used in Examples and Comparative Examples are described below.

Natural Rubber (NR): RSS #3

Diene rubber: SBR 1502 (amount of styrene units: 23.5% by weight) available from JSR Corporation Carbon black: N110 ($N_2SA$: 143 $m^2/g$, DBP absorption: 113 ml/100 g) available from Showa Cabot Co. Ltd.

Silica: Ultrasil VN3 ($N_2SA$: 210 $m^2/g$) available from Degussa Co.

Silane coupling agent: Si69 (bis(3-triethoxysilylpropyl)tetrasulfide) available from Degussa Co.

Antioxidant: NOCRAC 6C (N-(1,3-dimethylbutyl)-N'-phenyl-p-phenylenediamine) available from Ouchi Shinko Chemical Industrial Co., Ltd.

Stearic acid: Stearic acid available from NOF Corporation

Zinc oxide: Zinc oxide type 1 available from Mitsui Mining and Smelting Co., Ltd.

Sulfur: Powdery sulfur available from Tsurumi Chemicals Co., Ltd.

Vulcanization Accelerator TBBS: Nocceler NS (N-t-butyl-2-benzothiazyl sulfenamide), available from Ouchi Shinko Chemical Industrial Co., Ltd.

Vulcanization Accelerator DPG: Nocceler D (N,N'-diphenyl guanidine), available from Ouchi Shinko Chemical Industrial Co., Ltd.

Deproteinized natural rubber was prepared by the following method and then analyzed.

Deproteinization of Natural Rubber (Latex of Deproteinized Natural Rubber 1)

150 ml of a latex of high ammonia-type natural rubber (solid content 60.2%) available from Soctech Bhd. (Malaysia) was diluted with 2 L of distilled water, so that the solid rubber content became 10%. Then, the latex was stabilized by 0.12% sodium naphthenate and pH thereof was adjusted to 9.2 by adding sodium dihydrogen phosphate. Then, 7.8 g of deproteinizing enzyme Alcalase 2.0 M (available from Novo Nordisk Bioindustry Ltd.) was dispersed in 100 ml of distilled water and the solution was added to the diluted latex of natural rubber. After adjusting the pH to 9.2 again, the latex was maintained at 37° C. for 24 hours to conduct deproteinization. To the deproteinized latex, an anionic surfactant, sodium polyoxyethylene lauryl ether sulfide (KP4401 available from Kao Corporation), was added in a proportion of 1% by weight and centrifugation was conducted for 30 minutes at 10,000 rpm. After centrifuging, the creamy rubber separated as the top layer was taken out and diluted further with water to obtain latex of deproteinized natural rubber having solid rubber content of 60%.

(Latex of Deproteinized Natural Rubber 2)

A latex of deproteinized natural rubber was obtained in the same manner as latex of deproteinized natural rubber 1, except that a nonionic surfactant, polyoxyethylene octylphenyl ether (Emulgen 810, available from Kao Corporation), was used instead of an anionic surfactant.

Preparation of Deproteinized Natural Rubber (Polymer 1)

10% formic acid was added to latex of deproteinized natural rubber 1 to coagulate the rubber content and then, the rubber was made into a sheet by squeezing out serous fluid while passing the rubber through a roll. The sheet was dried in a 45° C. oven to obtain Polymer 1.

(Polymer 2)

After casting on a glass plate and drying at room temperature, latex of deproteinized natural rubber 1 was dried in vacuum to obtain Polymer 2.

(Polymer 3)

5% formic acid was added to latex of deproteinized natural rubber 2 and then, the rubber content was coagulated while injecting water vapor. After washing several times, the rubber was dried by hot air to obtain Polymer 3.

(Polymer 4)

After casting on a glass plate and drying at room temperature, latex of deproteinized natural rubber 2 was dried in vacuum to obtain Polymer 4.

The respectively obtained Polymers 1 to 4 and commercially available latex of high ammonia-type natural rubber (Hytex, available from Nomura Trading Co., Ltd.) were flow casted on a glass plate and after drying at room temperature, were dried in vacuum. After drying, Polymers 2 to 4 were extracted with a mixed solvent of acetone and 2-butanone (3:1) and the other Polymers were extracted with acetone to remove impurities such as homopolymers.

(Nitrogen Content)

The nitrogen content was measured by the Kjeldahl testing method.

(Gel Content)

In the present invention, the gel content of raw rubber refers to the value measured as matter that is insoluble in toluene. 70 mg of raw rubber samples cut into a size of 1 mm×1 mm was measured. 35 ml of toluene was added to the rubber samples and left still in a cool dark place for 1 week. Then, centrifugation was conducted to the precipitate the gel content that is insoluble in toluene and the supernatant, which is the soluble content, was removed. After washing with methanol, the gel content was dried and the weight thereof (mg) was measured. The gel content (%) was found from the following equation.

Gel content (%)=(weight after drying)/(weight of original sample)×100

(Molecular Weight)

The weight average molecular weight was found from measuring by the gel permeation chromatography method (solvent: tetrahydrofuran).

The analysis results are shown in Table 1.

TABLE 1

| | Nitrogen content (% by weight) | Gel content (% by weight) | Weight average molecular weight (Mw) |
|---|---|---|---|
| RSS #3 | 0.522 | 37.6 | $115 \times 10^4$ |
| Polymer 1 | 0.035 | 4.6 | $126 \times 10^4$ |
| Polymer 2 | 0.034 | 4.5 | $142 \times 10^4$ |
| Polymer 3 | 0.042 | 4.2 | $149 \times 10^4$ |
| Polymer 4 | 0.042 | 3.9 | $151 \times 10^4$ |

EXAMPLES 1 TO 7 AND COMPARATIVE EXAMPLES 1 TO 4

The components were kneaded and mixed according to the composition formulas shown in Tables 2 and 3 to obtain each sample rubber composition. The compositions were press vulcanized at 170° C. for 20 minutes to obtain vulcanized articles and with respect to the articles, each of the following tests of properties were conducted.

(Processability)

The Mooney viscosity was measured at 130° C. according to the method for measuring Mooney viscosity defined in JIS K6300.

The Mooney viscosity of Comparative Examples 1 and 3 ($ML_{1+4}$) were assumed to be 100 and processability was represented as an index by the following equation. The larger the index is the lower the Mooney viscosity and the better the processability.

Mooney Viscosity Index=($ML_{1+4}$ of Com. Ex. 1 or 3)/($ML_{1+4}$ of each Composition)×100

(Elastic Modulus (M300))

The tensile stress at elongation of 300% (M300) was measured according to JIS K6251-1993. Comparative Examples 1 and 3 were assumed to be 100 and the elastic modulus was represented as an index by the following equation. The larger the index is the better the elastic modulus.

Elastic Modulus (M300)Index=(elastic modulus of Com. Ex. 1 or 3)/(elastic modulus of each Composition)×100

(Abrasion Resistance Test)

The amount of Lambourn abrasion was measured under conditions of temperature of 20° C., slip ratio of 20% and testing time of 5 minutes with a Lambourn abrasion tester and the volume loss of each composition was calculated. The loss of Comparative Examples 1 and 3 were assumed to be 100 and abrasion resistance was represented as an index by the following equation. The larger the index is the better the abrasion resistance.

Abrasion Index=(loss of Com. Ex. 1 or 3)/(loss of each Composition)×100

(Rolling Resistance)

The tan δ of each composition was measured under conditions of temperature of 70° C., initial strain of 10% and dynamic strain of 2% using a viscoelasticity spectrometer VES (made by Iwamoto Corporation). The tan δ of Comparative Examples 1 and 3 were assumed to be 100 and rolling resistance was represented as an index by the following equation. The larger the index is the better the rolling resistance.

Rolling Resistance Index=(tan δ of Com. Ex. 1 or 3)/(tan δ of each Composition)×100

(Wet Skid Test)

Measurement of skid resistance was conducted according to the method of ASTM E303-83 using a portable skid tester made by The Stanley London Division of The Munro Group. The measured value of Comparative Examples 1 and 3 were assumed to be 100 and wet skid performance was represented as an index by the following equation. The larger the index is the better the wet grip properties.

Wet Skid Index=(Value of each Composition/Value of Com. Ex. 1 or 3)×100

TABLE 2

|  | Ex. | | | Com. Ex. | |
| --- | --- | --- | --- | --- | --- |
|  | 1 | 2 | 3 | 1 | 2 |
| Composition (parts by weight) | | | | | |
| RSS #3 | — | — | — | 100 | — |
| Polymer 1 | — | — | — | — | 100 |
| Polymer 2 | 100 | — | — | — | — |
| Polymer 3 | — | 100 | — | — | — |
| Polymer 4 | — | — | 100 | — | — |
| Carbon black | — | — | — | — | — |
| Silica | 50 | 50 | 50 | 50 | 50 |
| Silane coupling agent | 5 | 5 | 5 | 5 | 5 |
| Antioxidant | 1 | 1 | 1 | 1 | 1 |
| Stearic acid | 2 | 2 | 2 | 2 | 2 |
| Zinc oxide | 3 | 3 | 3 | 3 | 3 |
| Sulfur | 2 | 2 | 2 | 1.5 | 2 |
| Vulcanization accelerator TBBS | 1 | 1 | 1 | 1 | 1 |
| Vulcanization accelerator DPG | 0.5 | 0.5 | 0.5 | 0.5 | 0.5 |
| Evaluation | | | | | |
| Processability | 103 | 104 | 103 | 100 | 103 |
| Elastic modulus (M300) | 101 | 101 | 102 | 100 | 90 |
| Rolling resistance | 103 | 102 | 103 | 100 | 101 |
| Abrasion resistance | 96 | 102 | 103 | 100 | 95 |
| Wet grip performance | 101 | 100 | 101 | 100 | 99 |

TABLE 3

|  | Ex. | | | | Com. Ex. | |
| --- | --- | --- | --- | --- | --- | --- |
|  | 4 | 5 | 6 | 7 | 3 | 4 |
| Composition (parts by weight) | | | | | | |
| RSS #3 | — | — | — | — | 100 | — |
| Polymer 1 | — | — | — | — | — | 100 |
| Polymer 2 | 100 | — | — | — | — | — |
| Polymer 3 | — | 100 | — | 100 | — | — |
| Polymer 4 | — | — | 100 | — | — | — |
| Carbon black | 60 | 60 | 60 | 40 | 60 | 60 |
| Silica | — | — | — | 20 | — | — |
| Silane coupling agent | — | — | — | 2 | — | — |
| Antioxidant | 1 | 1 | 1 | 1 | 1 | 1 |
| Stearic acid | 2 | 2 | 2 | 2 | 2 | 2 |
| Zinc oxide | 3 | 3 | 3 | 3 | 3 | 3 |
| Sulfur | 1.5 | 1.5 | 1.5 | 1.5 | 1.5 | 1.5 |
| Vulcanization accelerator TBBS | 1 | 1 | 1 | 1 | 1 | 1 |
| Vulcanization accelerator DPG | — | — | — | 1 | — | — |
| Evaluation | | | | | | |
| Processability | 102 | 103 | 101 | 100 | 100 | 103 |
| Elastic modulus (M300) | 101 | 101 | 102 | 100 | 100 | 95 |
| Rolling resistance | 104 | 102 | 103 | 107 | 100 | 103 |
| Abrasion resistance | 100 | 101 | 103 | 100 | 100 | 96 |
| Wet grip performance | 101 | 102 | 101 | 104 | 100 | 101 |

According to the present invention, by containing a deproteinized natural rubber having weight average molecular weight of at least 1,400,000 and nitrogen content of at most 0.1% by weight, a rubber composition for a tire tread that is excellent in fuel efficiency and processability without losing properties such as mechanical properties and a pneumatic tire using the rubber composition for the tire tread can be provided.

What is claimed is:

1. A rubber composition for a tire tread comprising
   5 to 150 parts by weight of silica having nitrogen-adsorbing specific surface area of 100 to 300 $m^2/g$; and/or
   5 to 150 parts by weight of carbon black having nitrogen-adsorbing specific surface area of at least 70 $m^2/g$ and dibutyl phthalate oil absorption of at least 70 ml/100 g,
   based on 100 parts of a rubber component containing 5 to 100% by weight of a deproteinized natural rubber having weight average molecular weight of at least 1,400,000 and nitrogen content of at most 0.1% by weight.

2. The rubber composition for a tire tread of claim 1, wherein gel content of said deproteinized natural rubber measured as matter that is insoluble in toluene is at most 10% by weight.

3. The rubber composition for a tire tread of claim 1 or 2, which further comprises 0 to 20 parts by weight of a silane coupling agent based on 100 parts by weight of silica.

4. A pneumatic tire comprising the rubber composition for a tire tread of claim 1.

5. The rubber composition for a tire tread of claim 1, said rubber composition comprising both the 5 to 150 parts by weight of silica having nitrogen-adsorbing specific surface area of 100 to 300 $m^2/g$ and the 5 to 150 parts by weight of carbon black having nitrogen-adsorbing specific surface area of at least 70 $m^2/g$ and dibutyl phthalate oil absorption of at least 70 ml/100 g.

6. The rubber composition for a tire tread of claim 1, said rubber composition comprising the 5 to 150 parts by weight of silica having nitrogen-adsorbing specific surface area of 100 to 300 $m^2/g$.

7. The rubber composition for a tire tread of claim 1, said rubber composition comprising the 5 to 150 parts by weight of carbon black having nitrogen-adsorbing specific surface area of at least 70 $m^2/g$ and dibutyl phthalate oil absorption of at least 70 ml/100 g.

8. The rubber composition for a tire tread of claim 1, said rubber composition further comprising 2–15 parts by weight of a silane coupling agent based on 100 parts by weight of silica.

9. The rubber composition for a tire tread of claim 2, said rubber composition further comprising 2–15 parts by weight of a silane coupling agent based on 100 parts by weight of silica.

10. The rubber composition for a tire tread of claim 8, said rubber composition further comprising at least one component selected from the group consisting of a softening agent, antioxidant, vulcanizing agent, vulcanization accelerator and vulcanization accelerating aid.

11. The rubber composition for a tire tread of claim 9, said rubber composition further comprising at least one component selected from the group consisting of a softening agent, antioxidant, vulcanizing agent, vulcanization accelerator and vulcanization accelerating aid.

* * * * *